Nov. 5, 1935.  A. A. LEASLEY  2,019,916
VENDING MACHINE
Filed Jan. 29, 1934    3 Sheets-Sheet 1
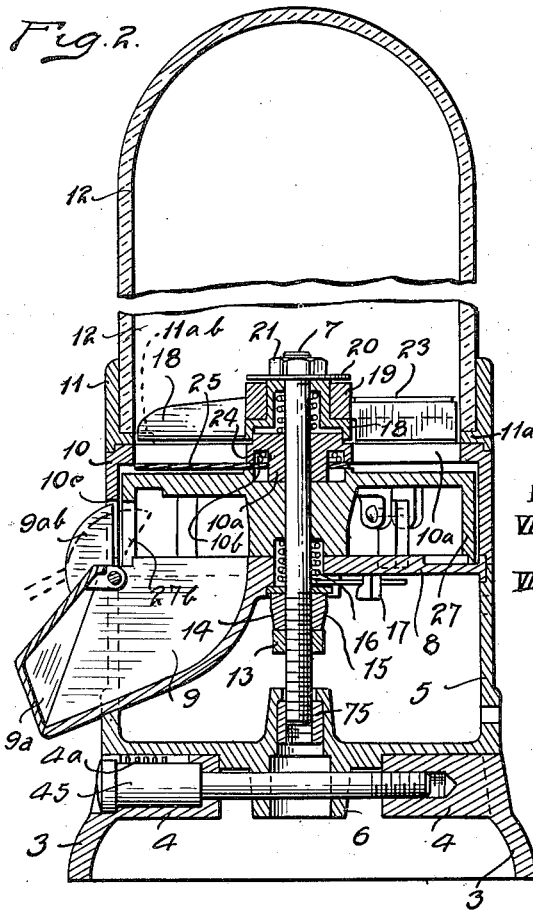
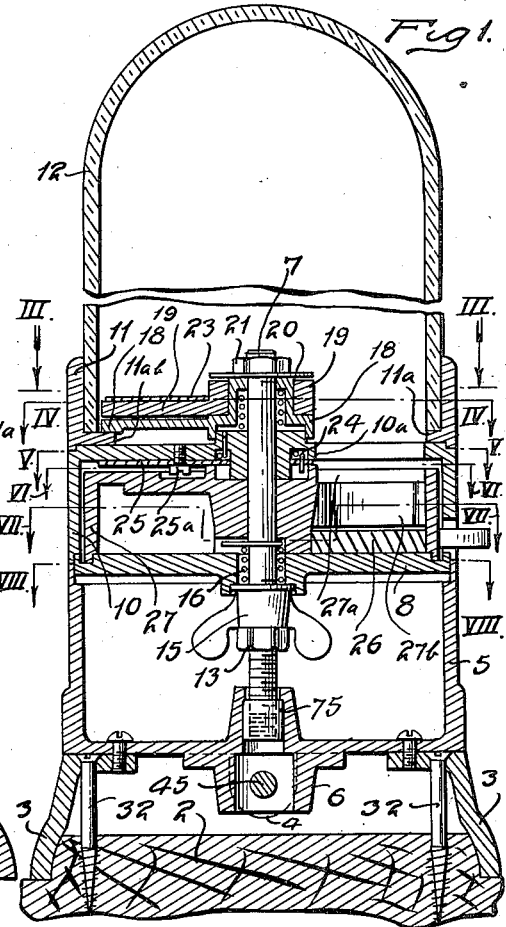
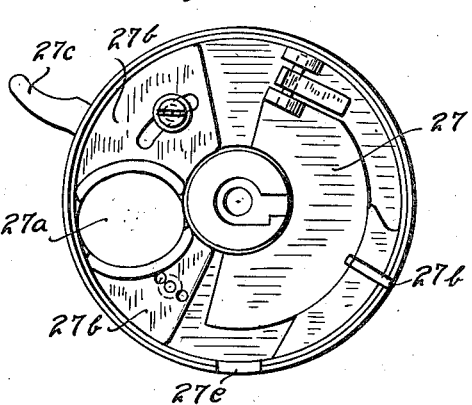
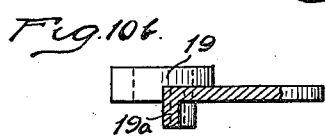
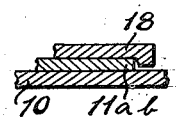
INVENTOR.
ALLEN A LEASLEY.
BY
ATTORNEY.

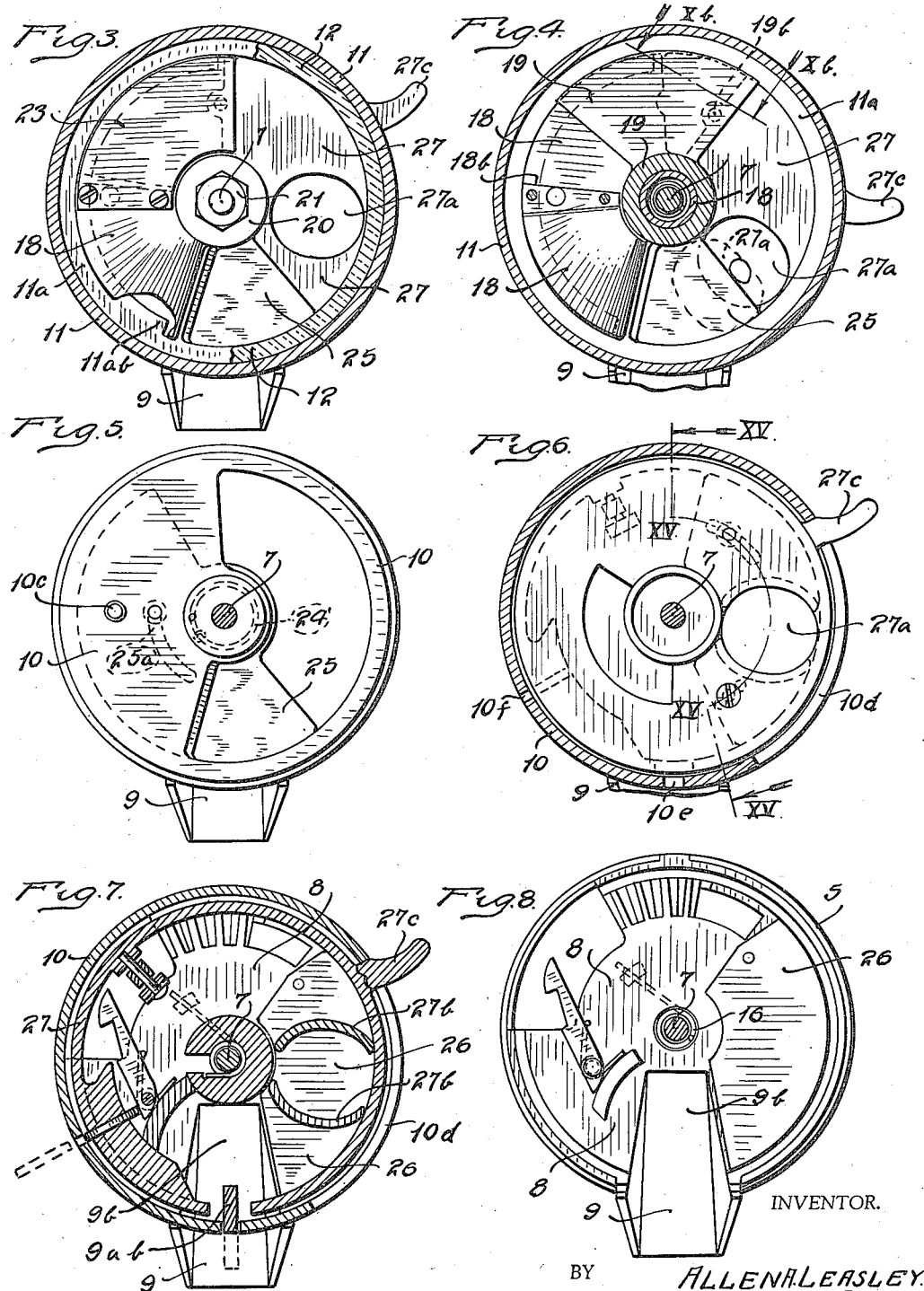

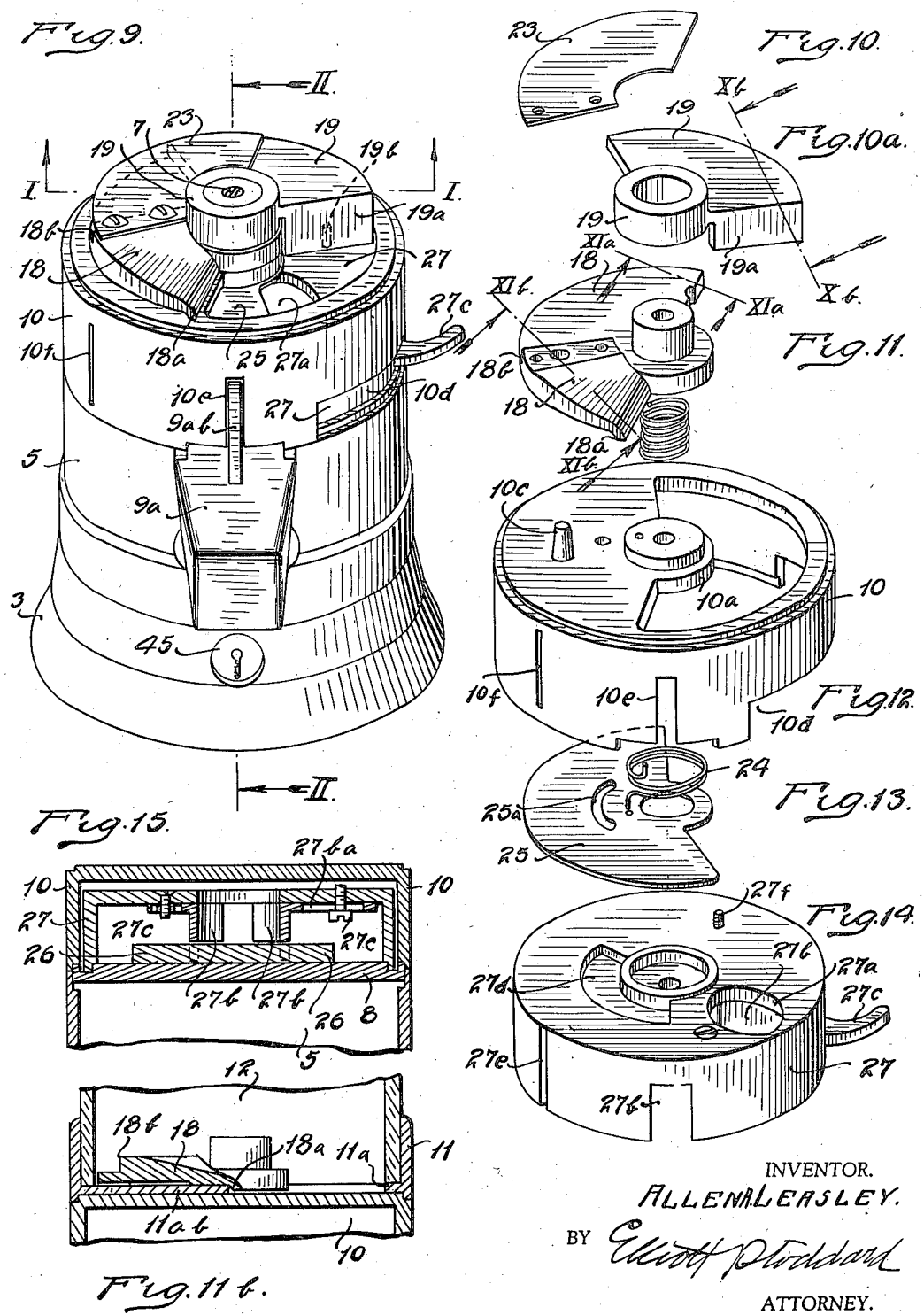

Patented Nov. 5, 1935

2,019,916

UNITED STATES PATENT OFFICE 2,019,916

VENDING MACHINE

Allen A. Leasley, Detroit, Mich.

Application January 29, 1934, Serial No. 708,818

10 Claims. (Cl. 221—109)

My invention relates to vending machines and objects of my improvements are to provide an apparatus that is adapted to the conventional modes of manufacture and that has an improved structure and mode of operation especially in that the merchandise receptacle is conveniently attached and detached; and secured against unauthorized displacement; the clogging of operation by articles caught between the edge of the delivery receptacle and the shielding plate is obviated; the delivery receptacle is conveniently adjustable in capacity; the delivered merchandise cannot be removed except when the delivery apparatus has returned to its normal position; and the delivery apparatus cannot be operated when delivered merchandise is being removed from its receptacle.

I secure these advantages in the apparatus illustrated in the accompanying drawings, in which:—

Figure 1 is a vertical central section in the plane indicated by the line and arrows I—I, Figure 9, a portion being removed to economize space.

Figure 2 is a similar section at right angles to the section of Figure 1 as indicated by the line and arrows II—II, Figure 9.

Figure 3 is a section on the line III—III, Figure 1, the glass cylinder 12 being however broken away as indicated by the designating figures 12—12 placed at the edges of the sectioned portion in Figure 3.

Figure 4 is a section on the line IV—IV, Figure 1, the merchandise receptacle being removed.

Figure 5 is a plan view the parts above the line V—V, Figure 1, being removed.

Figure 6 is a section mainly on the line VI—VI, Figure 1, the wall of the section 10 being sectioned in the plane of the cut-away portion 10d.

Figure 7 is a section on the line VII—VII, Figure 1.

Figure 8 is a plan view, the parts above the line VIII—VIII, Figure 1, being removed.

Figure 9 is a perspective view, the merchandise receptacle at its attaching annular section being removed.

Figure 10 is a detail perspective view of the protecting plate for the stirrer 19.

Figure 10a is a detail perspective view of the stirrer.

Figure 10b is a detail section on the line $xb$—$xb$ Fig. 10a.

Figure 11 is a perspective view of a plate that acts to retain the merchandise receptacle and lock it in place in the apparatus and also serves in conjunction with the protecting plate 23 to receive the horizontal flat portion of the stirrer 19 and protect it from the contact of the merchandise.

Figure 11a is a detail section on the line XIa— XIa, Figure 11.

Figure 11b is a detail section on the line XIb— XIb, Figure 11.

Figure 12 is a perspective view of a sectional part of the apparatus.

Figure 13 is a perspective view of the yieldable disc which prevents the jamming of the apparatus.

Figure 14 is a perspective view of the delivery apparatus.

Figure 15 is a section looking in the direction of the arrows and taken on the radial lines XV— XV, and on the curved lines XVa—XVa, Figure 6.

Figure 16 is an inverted plan view of parts above the section line VIII—VIII, Figure 1.

3 is a circular base, preferably connected to a fixed support 2 by screws 32. 5 is a cylindrical section having an open upper end and a lower end closed by a web having the hollow cylindrical projection 6 from its lower surface. The part 5 fits upon and is permanently secured to the base 3, coaxial therewith and covering the heads of the screws 32. 4, 4 are lugs integral with the base 3 within the same. There is a bolt 45 passing through an aperture in one of the lugs 4 then through two apertures in the walls of the projection 6 and then engaging by screw threads in the other of the projections 4. This bolt secures section 5 in position. 4a are conventional pins of a pin-lock securing the bolt 45 in position so that it cannot be rotated about its axis until the proper key is inserted to adjust the pins in the conventional way.

8 is a circular plate fitting upon the upper end of the section 5 with its periphery in a groove in the interior wall of said section at its upper edge. 9 is a delivery spout formed integral with the plate 8, and opening from the upper surface of said plate and laterally. The spout 9 forms a projection from the plate 8 which fits into an opening formed through the wall of the section 5 for that purpose so that the projection 9 forms a delivery spout opening to the outside of the apparatus. 9a is a cover for the delivery opening of the spout 9 pivoted at its upper edge to said spout provided with an upwardly extending lug 9ab for a purpose hereinafter described.

10 (Figs. 1, 2, 9, and 12) is a second cylindrical section having its upper end about half open and the other half closed by a web as shown distinctly in Figure 12. The section 10 has a downwardly extending lug 10a of the form shown in the cross sections Figures 1 and 2, so shaped as to form an annular cavity 10b to receive the spring 24 hereinafter referred to.

25 (Figs. 1, 2, and 13) is a thin metal plate, semi-circular in shape and engaging at its center around a portion of the projection 10a. The spring 24 engages at one end with the section 10 and at the other end with the plate 25 so as to tend to rotate said plate in the opposite direction to the hands of a watch. The plate 25 is provided with a concentric slot 25a through which a screw passes and engages the web of the section 10 as shown in Figure 1, thus serving to limit the motion of the plate 25 about the projection 10a.

11 is a third section that rests with its lower edge in a groove around the periphery of the section 10 and concentric therewith. 12 is a glass receptacle for merchandise. This is closed at its upper end and at its lower end is fixed in the section 11 with its lower edge resting upon an interior circular ledge 11a extending from the inner wall of the section 11 near its lower end, the ledge 11a is extended for a distance something less than its semi-circumference to form an engaging flange 11ab (Figs. 3 and 1).

18 (Figs. 1, 2, 9, and 11) is a semicircular plate provided with a hub at its center coaxial with the section 10 and provided with a radially extending ridge or shoulder 18b (Figs. 11 and 11b). The two radial edges of the plate 18 extend downward to form lugs 18a (Figs. 11, 11a, and 11b). 23 is a thin arcuate plate secured at a radial edge to the surface of the plate 18 so as to extend beyond the ledge 18b concentric with the plate 18, and forming an opening between said plates beyond said ledge.

19 is an arcuate plate having the downwardly extending wing 19a at one of its radial edges and having a hub coaxial with the section 10 and plate 18. The plate 19 fits within the space between the plates 23 and 18 with its wing 19a extending downward beyond the edges of said plates.

27 is a cylindrical part having its lower end open and its upper end closed except for an aperture 27a through which the merchandise passes into a receptacle formed within said part by the arcuate plates 27b, which form a receptacle constituting an extension of the aperture 27a. The part 27 has a hub at its center concentric therewith and is located within and coaxial with the section 10, its lower edge resting in a circular groove near the periphery of the plate 8. 26 is an arcuate plate closing the lower end of the receptacle formed by the parts 27b and forming a surface upon which the lower edges of said parts travel. 27c is a thumb piece by which the part 27 may be rotated. 16 is a helical spring one end engaging the plate 8 and the other end the part 27, so as to tend to rotate said part in the opposite direction to the hands of a watch.

7 is a bolt, screw threaded at its ends and passing through an aperture at the center of the closed lower end of the section 5 and secured therein by a nut 75. The bolt 7 also extends concentrically through openings in the plate 8, the part 27, the section 10 and the hubs of the plates 18 and 19. 20 is a washer at the upper end of the bolt 7 and 21 is a securing nut on the upper end of said bolt. 15 is a wing nut upon the bolt 7 below the plate 8, its upper end engaging against said plate and 13 is a jam-nut.

The various sections, and the part 27 constituting the delivery part, are bound and secured together by the bolt 7 and the nuts thereon. The bolt 45 prevents access to the nut 75 to remove the same.

The section 10 is provided with a cut away portion 10d (Figs. 9 and 12) in which the thumb piece 27c oscillates in the motion of the delivery part 27. 27f is a pin extending upwards from the part 27 and engaging in an aperture in the wing 19a of the plate 19 so that said plate is carried with the delivery part in its motion.

10e (Fig. 12) is a slot in the wall of the section 10 in position to permit the passage of the lug or flange 9ab (Figs. 2 and 9). 10f is a second slot in the wall of said section to permit the passage of the coin. 10c is a cylindrical lug extending upward from the web of the part 10 adapted to engage in a corresponding aperture in the plate 18 to fix said plate in position. 27bc (Fig. 14) is a slot extending upward from the lower edge of the wall of the part 27 and 27e is a second slot in said wall, these slots registering respectively with the slots 10e and 10f in the section 10 when the delivery part 27 is at the beginning of its stroke. The depression 27d in the web of the part 27 affords space for the movement of the head of the screw passing through the slot 25a in the plate 25 and limiting the movement of said plate.

The nut 75 at the lower end of the bolt 7 is provided at its lower end with a slot to receive the edge of a screwdriver to adjust said nut in position, to remove, or to tighten the same.

The parts 27b are provided with flanges at their upper ends by which they are secured to the lower surface of the web of the part 27 by screws such as 27c and they may be adjusted toward or from each other to form a smaller or larger receptacle (Figs. 15 and 16) or the plate 26 may be removed and the walls 27b extended clear to the surface of the plate 8 as indicated in broken lines in Figure 15, thus forming a deeper receptacle.

The method of using the above described apparatus is as follows:—

The receptacle 12 being filled with the goods, such as nuts or small pieces of confectionery to be delivered, said receptacle is adjusted for placing upon the upper edge of the part 10 and concentric therewith, the extension 11ab of the ledge 11a passing under and past a radial edge of the plate 18. The nut 75 being slightly loosened the plate 18 may be raised and the extension 11ab of the ledge 11a may pass under said plate, the receptacle 12 and part 11 being turned about its axis until the ends of the said extension come within the lugs 18a. The nut 75 is then tightened up bringing the plate down to position. The lugs 18a then prevent the turning of the receptacle 11, 12, and the plate 18 prevents its being raised vertically.

The delivery part 27 being in its initial position the small articles in the receptacle 12 may fall through the opening 27a and fill the receptacle formed by the plates 27b. When the coin has been inserted through the slots 10f and 27e the part 27 is rotated by the thumb piece 27c carrying the receptacle formed by the plates 27b to position over the opening 9b of the delivery spout 9 and the articles contained therein will fall into said spout and be retained therein by the lid 9a.

These articles, however, cannot be removed from the spout until the delivery part 27 has returned to its initial position because the cover 9a cannot be raised, the lug 9ab striking against the wall of the part 27. But when said part has returned to its initial position the slot 27bc comes opposite the slot 10e and the cover 9a may be raised, the lug 9ab passing freely through said slots. But when said cover is raised the lug 9ab engaging in the slot 27bc prevents the actuation of the part 27 until the lid is again closed.

When the part 27 is turned about its center it carries the plate 19 with it by means of the engaging pin 27f, the wing 19a of the plate 19 acting as a stirrer and preventing the clogging of the articles to be delivered.

Should one of the articles to be delivered extend part way into the receptacle in the part 27 it would be engaged by the edge of the opening 27a and the edge of the plate 25 (see Fig. 4) and said plate would be pushed backwards in the further movement of the part 27 against the action of the spring 24. When the part 27 again returns to its initial position, said engaging edges are separated and the article falls into the delivery receptacle without being injured or without having clogged the operation of the apparatus.

What I claim is:—

1. In an apparatus of the kind described, the combination of a casing consisting of a plurality of sections, a centrally located bolt within the wall of said casing binding said sections together, a laterally extending plate upon said bolt, and a merchandise receptacle adapted to fit over said casing and having an inwardly extending portion adapted to engage under said plate.

2. In an apparatus of the kind described, the combination of a casing consisting of a plurality of sections, a centrally located bolt within the wall of said casing binding said sections together, a laterally extending plate upon said bolt, and a merchandise receptacle adapted to fit over said casing and having an inwardly extending portion adapted to engage under said plate, and means for preventing unauthorized manipulation of said bolt.

3. In an apparatus of the kind described, the combination of a casing, a bolt within the wall of said casing, a laterally extending plate upon said bolt, and a merchandise receptacle adapted to fit over said casing and having an inwardly extending portion adapted to engage under said plate by a rotation of said receptacle about its axis.

4. In an apparatus of the kind described, the combination of a casing, a bolt within the wall of said casing, a laterally extending plate upon said bolt, and a merchandise receptacle adapted to fit over said casing and having an inwardly extending portion adapted to engage under said plate by a rotation of said receptacle about the axis, and means for engaging said plate and receptacle to prevent relative rotation after said portion has passed under said plate.

5. In an apparatus of the kind described, the combination of a merchandise receptacle, a movable part having a pocket therein adapted to receive articles from said receptacle and carry them under a guard plate to a delivery apparatus, and a plate yieldable in the plane of its surfaces forming an extension of said guard plate over said movable part in position to be engaged and caused to yield by any of such articles protruding from said pocket, as and for the purpose described.

6. In an apparatus of the kind described, a movable part for conveying articles to a delivery receptacle, a delivery receptacle, a movable cover for said delivery receptacle, said movable part being arranged to interpose itself in the line of travel of said cover to prevent the opening of said receptacle when it shall have moved from its initial position, and said cover being constructed to interpose itself in the line of travel of said movable part when it is raised to open said receptacle.

7. In an apparatus of the kind described, the combination of a cylindrical casing, a bolt coaxial with said casing, a delivery part adapted to turn about said bolt and having an eccentric delivery pocket, a guard plate adapted to cover said delivery pocket and a plate adapted to resiliently turn about said bolt forming an extension of said guard plate.

8. In an apparatus of the kind described, a casing, a delivery spout leading from said casing, a carrier part adapted to receive articles and deliver them to said spout, a cover for the delivery end of said spout, a lug extending from said cover, said casing being provided with a slot through its wall opposite said lug, said cover being so constructed that it shall cause said lug to pass through said slot and into the line of travel of said carrier part when said cover is raised and said part is in its initial position, said carrier part being so arranged that it shall interpose a wall in the line of travel of said lug and prevent the raising of said cover except when said carrier part is in its initial position.

9. In an apparatus of the kind described, the combination of a casing, a bolt within the wall of said casing, a laterally extending plate upon said bolt, and a merchandise receptacle adapted to fit over said casing and having an inwardly extending portion adapted to engage under said plate by a rotation of said receptacle about the axis, and means for engaging said plate and receptacle to prevent relative rotation after said portion has passed under said plate, and means for preventing unauthorized release of the engagement preventing relative rotation.

10. In an apparatus of the kind described, the combination of a merchandise receptacle, a movable part having a pocket therein adapted to receive articles from said receptacle and carry them under a guard plate to a delivery apparatus, said guard plate being resiliently yieldable in the plane of its surface and extending over said movable part in position to be engaged and caused to yield by any of said articles protruding from said pocket.

ALLEN A. LEASLEY.